W. G. KIRCHHOFF.
DOUGH DIVIDER.
APPLICATION FILED DEC. 26, 1911.

1,217,778.

Patented Feb. 27, 1917.
2 SHEETS—SHEET 1.

WITNESSES
Wm. Jannus.
J. A. Bishop

INVENTOR
WILLIAM G. KIRCHHOFF
BY F. W. Carnwall, ATT'Y.

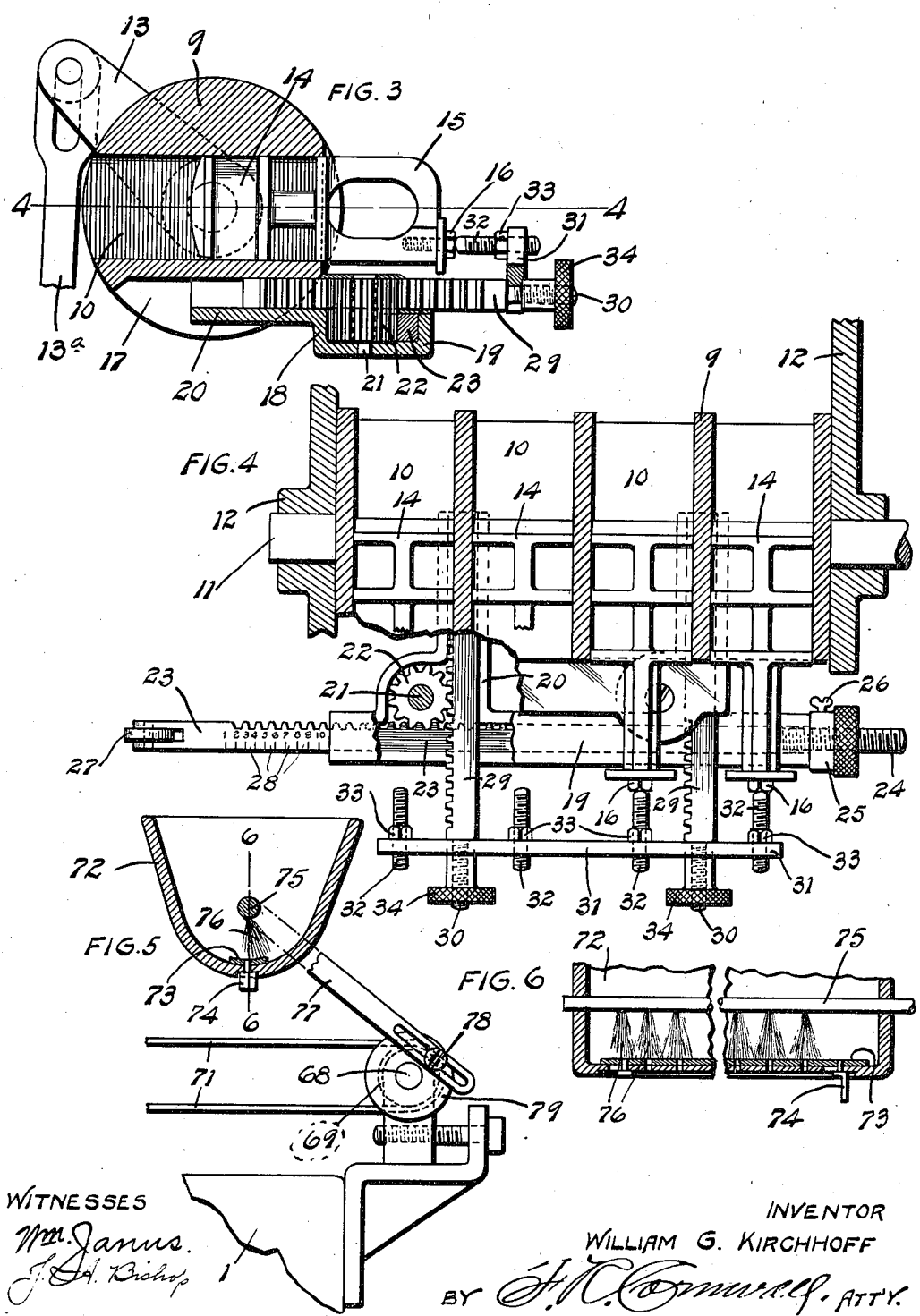

UNITED STATES PATENT OFFICE.

WILLIAM G. KIRCHHOFF, OF ST. LOUIS, MISSOURI, ASSIGNOR TO AMERICAN BAKERS MACHINERY COMPANY, OF ST. LOUIS, MISSOURI, A CORPORATION OF MISSOURI.

DOUGH-DIVIDER.

1,217,778.  Specification of Letters Patent.  Patented Feb. 27, 1917.

Application filed December 26, 1911. Serial No. 667,767.

*To all whom it may concern:*

Be it known that I, WILLIAM G. KIRCHHOFF, a citizen of the United States, residing at St. Louis, Missouri, have invented a certain new and useful Improvement in Dough-Dividers, of which the following is a full, clear, and exact description, such as will enable others skilled in the art to which it appertains to make and use the same, reference being had to the accompanying drawings, forming part of this specification, in which—

Figure 1 is a side elevation of a dough-dividing machine of my improved construction, parts thereof being shown in vertical section for the purpose of more clearly illustrating the construction of various parts.

Fig. 2 is a detail plan view of the cam utilized for imparting movement to the arm which actuates the compressed dough-discharging means.

Fig. 3 is an enlarged cross section taken approximately through the center of the oscillating head in which the dough-compressing chambers are formed.

Fig. 4 is a horizontal section taken approximately on the line 4—4 of Fig. 3 with parts thereof broken away.

Fig. 5 is an enlarged detail elevation showing the parts seen looking in the direction by the arrow 5 in Fig. 1, and showing a flour hopper in section.

Fig. 6 is a detail section taken approximately on the line 6—6 of Fig. 5.

This invention relates to machines for dividing large quantities of dough or like material into lumps or portions of predetermined size and weight, and the particular objects of my invention are to produce a simple, inexpensive and easily operated machine which will accurately divide dough with greater accuracy than has heretofore been possible by hand work, to provide a machine which can be operated with comparatively little power, to provide a number of adjustments in the operating members of the machine whereby accuracy of spring tension and exactness of movement of certain parts of the machine can be easily and quickly obtained and to provide a machine which is practically automatic in operation.

With the above objects in view, my invention consists in certain new and novel features of construction and arrangement of parts hereinafter more fully described and claimed.

Referring by numerals to the accompanying drawings, 1 designates the body of my improved machine which is approximately rectangular in form and projecting upwardly from the rear portion of said body is an extension 2, in the upper portion of which is formed a horizontally disposed chamber 3 through which is adapted to slide a plunger 4.

5 designates a horizontally disposed plate which is arranged for sliding movement in grooves 6 formed in the inner faces of the side sills of the chamber 3 immediately above the plunger 4 and the forward edge of this plate is provided with a knife edge 5ª.

Located immediately above the forward portion of the chamber 3 is a hopper 7 into which the mass of dough to be divided into uniform sized lumps is delivered.

Located in the front portion of the chamber 3 is a shell or bushing 8, the opening through which gradually tapers toward its outer end and the front face of this bushing is concave in cross section in order to fit snugly against the surface of an oscillating head 9 in which is formed a series of diametrically disposed chambers 10 of uniform size into which the dough is compressed after being forced from the chamber 3 by the plunger 4.

The ends of the head 9 are provided with trunnions 11 which are journaled in suitable bearings formed on brackets 12 projecting forwardly from the sides of the extension 2 and one of these trunnions 11 is extended beyond this bearing to receive a crank arm 13. Connected to the end of this crank arm 13 is the upper end of a rod 13ª, the lower end of which is pivotally connected to a crank arm 13ᶜ carried by the main driving shaft of the machine.

Arranged to move freely through each opening 10 is a head or plunger 14, and formed on or fixed to the rear sides of these plungers are plates 15 in the outer ends of which are seated headed bolts 16.

One side of the oscillating head 9 is cut away, as designated by 17, and fixed to the head in this cut away portion is a specially formed casting 18, the same comprising a housing 19 which is parallel with the axis of the head 9, and extending laterally from this housing into the cut away portion 17 of said head is a pair of housings 20. Journaled for rotation on studs or pins 21, seated in the housing adjacent the points where the parts 20 diverge from the part 19 are pinions 22, and engaging therewith and arranged to slide through the housing 19 is a rack bar 23. One end of this rack bar is rounded and threaded, as designated by 24, and positioned on this threaded end is a nut 25, provided with a locking screw 26. The opposite end of the rack bar is provided with an anti-friction roller 27, and formed on the face of this end of the rack bar is a graduated scale 28.

Arranged for sliding movement through the housings 20 are rack bars 29 which engage with the pinions 22 immediately above the rack bar 23, and the outer ends of these rack bars 29 are rounded and threaded, as designated by 30. Positioned on these rounded, threaded portions and bearing against the shoulders between said rounded, threaded portions and the bodies of said rack bars is a bar 31 in which is screw-seated a series of screw bolts 32, the forward ends of which are adapted to engage against the heads of the bolts 16 carried by the plates 15.

Lock nuts 33 are located on the screw bolts 32, and positioned on the threaded portions 30 of the rack bars 29 behind the bar 31 are nuts 34.

35 designates a shaft journaled in the lower portion of the frame of the machine, which shaft is driven in any suitable manner, and mounted on said shaft within the body or framework is a pair of eccentrics 36 and 37. Arranged on the eccentric 36 is a strap 38, and seated therein are the inner ends of a pair of rods 39, which extend rearwardly through an opening in the rear wall of the base or housing 1, and the outer ends of said rods are seated in a disk 40.

41 designates a rod which is arranged between the pair of rods 39 and the inner end of this rod is journaled loosely in a bearing formed in the strap 38. A portion of the rod adjacent the inner end thereof is threaded and passes through a corresponding threaded aperture formed in a disk 42, which latter is arranged to slide freely upon the inner portions of the rods 39. Interposed between the disks 40 and 42 and inclosing the rods 39 and 41 is a comparatively heavy coil spring 43.

44 designates a lever fulcrumed at its lower end upon a transversely disposed shaft 45 at the rear lower portion of the body 1 and located in an opening 45$^a$ formed in this lever is a rocking bearing 46 through which the outer end of the rod 41 passes.

Fixed on the rod 41 inside the bearing 46 is a collar 47, and fixed on the outer end of said rod on the opposite side of said bearing is a hand wheel 48.

The upper end of the lever 44 occupies a position within the bifurcated rear end of a link 49, the forward end of which is pivotally connected to the plunger 4. A pin 44$^a$ is seated in the upper end of the lever 44 and extends through horizontally disposed slots 49$^a$ formed in the bifurcated rear end of the link 49.

50 designates a screw rod which is provided with a hand wheel 51, and which screw rod extends through the rear end of the link 49 and bears against the rear side and upper end of the lever 44. This screw rod is for the purpose of adjusting the posterior point of operative connection between the lever 44 and link 49 as it forms a stop against which pin 44$^a$ comes up on the rearward movement of the lever 44. After the proper adjustment is obtained the screw rod 50 can be locked by a set screw 52 which passes through the rear portion of the link 49 and engages said screw rod.

Arranged on the eccentric 37 is a strap 53, and extending rearwardly therefrom is a rod 54, the rear end of which is pivotally connected to a lever 55, and the lower end of this lever is journaled upon the shaft 45.

A link 56 is pivotally connected to the upper end of the lever 55, and the forward end of said link is pivotally connected to the plate 5.

57 designates a counter-shaft journaled in suitable bearings in the body 1, and fixed on said shaft within said body is a pinion 57$^a$ which meshes with a large gear wheel 58, which latter is fixed on the shaft 35.

Fixed on the outer end of the shaft 57 is a beveled pinion 59 which meshes with a corresponding beveled pinion 60, and which latter pinion is fixed on the rear end of a shaft 61, the same being journaled in suitable bearings 62 on the side of the body 1. Carried by this shaft 61 is a roller 63 around which passes a belt or apron 64 adapted to carry the lumps of dough away from the machine.

65 designates a shaft journaled in suitable bearings 66 on the side of the machine immediately above the bearings 62, and said shaft 65 is driven from the shaft 61 by a train of gearing 67.

Arranged in suitable bearings on the opposite side of the machine over the shaft 65 is a shaft 68 carrying a roller 69, and operated thereon and upon a corresponding roller 70 carried by the shaft 65 is a belt or apron 71 which receives the lumps of dough as they are discharged from the chambers 10 in the oscillating head, and said apron or belt delivers these lumps of dough onto the belt or apron 64.

Positioned above the right hand end of the belt 71 is a receptacle 72 adapted to receive a supply of flour which is sprinkled onto the surface of the belt 71 to prevent the lumps of dough from sticking thereto, and arranged to slide lengthwise in the bottom of this receptacle is a plate 73 provided with a series of perforations which are adapted to coincide with a series of corresponding perforations formed in the bottom of the receptacle. This plate is provided with a depending finger 74 which may be engaged to move the plate lengthwise thereby cutting off the discharge of flour from the receptacle.

Journaled in the end walls of the receptacle 72 is a longitudinally disposed rock shaft 75 and depending therefrom is a series of brushes 76 which are adapted to brush across the surface of the perforated plate 73 as the shaft 75 is rocked. Fixed to the inner end of this shaft 75 is an arm 77 the lower end of which is slotted to receive a pin 78, which latter is seated in a disk 79 carried by the end of the shaft 68. As the disk 79 rotates vibrating movement is imparted to the arm 77, thereby rocking the shaft 75 and causing the brushes to sweep over the slotted plate 73, and when said plate is shifted so that its perforations register with the perforations in the bottom of the receptacle 72, the flour in the bottom of said receptacle is agitated and caused to discharge through the coinciding perforations.

80 designates a vertically disposed rock shaft which is mounted in suitable bearings on the side of the body of the machine immediately to the rear of the train of gearing 67, and fixed on the lower end of this shaft is a crank arm 81 carrying on its outer end a roller 82 which is adapted to be engaged by a segmental cam 83, which latter is carried by the shaft 35. The upper end of this shaft 80 is provided with an upwardly curved, forwardly extending arm 84, the outer end of which is adapted to engage against the roller 27 carried by the end of the rack bar 23. Located upon this shaft 80 is a torsion spring 85 one end of which bears against the side of the extension 2, and the opposite end of which engages a pin 86 which is carried by said shaft 80. The tendency of this spring is to rotate said shaft 80 so as to move the upper end of the arm 84 away from the end of the rack bar 23, and to move the end of the crank arm 81 outwardly into the path of travel of the segmental cam 83.

During the operation of my improved dough-divider the shaft 35 is driven in any suitable manner, and the mass of dough to be divided into lumps of uniform size and weight is delivered into the hopper 7.

The eccentric 36 in moving toward the rear side of the machine imparts rearward swinging movement to the lever 44, and, as a result, the plunger 4 is moved rearwardly through the chamber 3, thereby producing suction in said chamber which action draws a portion of the mass of dough downwardly into said chamber until the same is filled. During this movement the eccentric 37, which is in advance of the eccentric 36, is by means of the rod 54 imparting rearward swinging movement to the lever 55, thereby moving the plate 5 rearwardly with the plunger 4.

During the rearward movement of the plunger and the filling of the chamber 3 the oscillating head 9 is moved into the position shown in Fig. 1 with the chambers 10 occupying vertical positions so that the lumps of dough forced into said chambers can be discharged therefrom onto the apron 71. This oscillation of the head 9 is effected by means of the crank arm 13$^c$ and rod 13$^a$, the upper end of which latter is connected to the crank arm 13 fixed on one of the trunnions of said oscillating head.

As the eccentric 36 moves toward the front of the machine, the lever 44 is swung forward, thereby moving the head 4 through the chamber 3 and forcing the dough within said chamber into the chambers 10 in the oscillating head 9, which latter had been rocked by means of the crank arms 13 and 13$^c$ and rod 13$^a$ so as to bring the chambers 10 into a horizontal plane with their forward ends communicating with the mouth of the bushing 8. The eccentric 37 effects a forward swinging movement of the lever 55, thereby moving the plate 5 with the knife edge forwardly between the head 4 and the bottom of the hopper 7, thereby cutting off the volume of dough drawn into the chamber 3, and as the head 4 moves forwardly this dough is compressed into the chambers 10 and in so doing the plungers 14 are moved rearwardly through said chambers until the heads of the bolts 16 engage the screw bolts 32 which perform the function of stops. These screw bolts are carried by the bar 31, the same being mounted on the rack bars 29, and during the rearward movement of these rack bars the pinions 22 are rotated, thereby imparting sliding movement to the rack bar 23, and the movement of this last mentioned rack bar is regulated by the position of the nut 25 on the threaded end 24 of said rack bar. When this nut engages against the end of the housing 19 further movement of said rack bar and the rack bar 29 is prevented, and consequently, an adjustment of the nut 25 and an adjustment of the screw rods 32 regulates the distance which the plungers 14 move through the chambers 10 when the dough is being compressed therein.

After the dough is compressed in the chambers 10 in front of the plungers 14 the continued movement of the cranks 13 and 13$^c$ and rod 13$^a$ partially rotates the head 9 and during this time the plunger 4 and plate 5 remain stationary at their forward limit of movement until the head 9 is rotated a sufficient distance to cut off communication between the chambers 10 and the chamber 3, and at this point in the operation the plunger 4 and plate 5 are drawn rearwardly through the chamber 3 by the connections to the eccentrics 36 and 37. When the head has been rocked to bring the chambers 10 into a vertical plane the segmental cam 83 engages the roller 82 and moves the same inwardly toward the side wall of the machine, thereby rocking the shaft 80, and consequently, swinging the free end of the arm 84 into engagement with the roller 27. As this movement continues due to the travel of the roller 82 onto the high portion of the cam 83, the pressure of the end of the arm 84 against the roller 27 moves the rack bar 23 through the housing 19, thereby imparting rotary motion to the pinions 22, and consequently, moving the rack bars 29 through the housings 20.

The bar 31 moves with the rack bars 29 and the screw bolts 32 bearing upon the heads of the bolts 16 carried by the outer ends of the plungers 14 moves said plungers downwardly through the chambers 10, thereby discharging the lumps of compressed dough from said chambers onto the apron 71. This apron is driven from the shaft 61 by means of the train of gearing 67 and the lumps of dough discharged from said apron 71 onto the apron 64, which latter delivers the lumps of proper size and weight to the rounding or molding machine.

The spring 43 provides means whereby yielding pressure is applied to the dough by the head 4, and this yielding pressure can be accurately regulated even while the machine is in operation by engaging the hand wheel 48 and rotating the rod 41, which action shifts the position of the disk 42, which latter is loosely mounted on the rods 39 and against which disk the end of the spring 43 engages. Thus the pressure against the dough is not a solid unresisting pressure, but is yielding to a certain degree, and such yielding pressure does not kill or deaden the dough after the manner of a solid unresisting pressure.

The screw rod 50 provides means for shifting the point of pivotal connection between the upper end of the lever 44 and the link 49 and this adjustment regulates the distance traveled by the head 4 in the chamber 3 and therefore governs the amount of dough drawn into said chamber by the suction produced during the rearward movement of said head.

This adjustability of the head 4 in combination with the adjustability of the mold compartments is very important and has a very useful function. It is obvious that if the stroke of the head 4 were constant, the same quantity of dough would be drawn from the hopper, irrespective of the capacity of the mold compartments. The result would be that the small loaves would be denser than the large loaves, and the dough in the small loaves would be deadened by the pressure of head 4, due to the fact of there not being mold capacity to receive it. The combination of the adjustable head 4 and the adjustable molding compartments, therefore, permits the molding of different sized loaves of the same density, equal sized loaves of different density, or different sized loaves of different density.

The adjustable nut 25 and the adjustable screw rods 32 control the rearward movement of the plungers 14 through the chambers 10 and the graduated scale 28 provides for the accurate adjustment of the position of the rack bar 23 so that lumps of different weight and size may be produced. In addition to the adjustment provided for the rack bar 23, the screw rods 32 provide means for individual adjustment of the rearward movements of the plungers 14 through the chambers 10.

The machine of my improved construction is comparatively simple, can be operated with little power and is equipped with various adjustments whereby the size and weight of the lumps of dough produced can be accurately regulated.

It will be readily understood that minor changes in the size, form and construction of the various parts of my improved dough divider can be made and substituted for those herein shown and described without departing from the spirit of my invention, the scope of which is set forth in the appended claims.

I claim:

1. In a machine of the class described, an oscillatory head provided with dough receiving chambers, an independently moving plunger in each chamber, a pair of rack bars mounted for sliding movement on the head, means carried by said rack bars for engaging the plungers, a rack bar arranged at right angles to the first mentioned rack bars and pinions forming a connection between the single rack bar and the pair of rack bars.

2. In a machine of the class described, an oscillatory head provided with dough receiving chambers, an independently moving plunger in each chamber, a pair of rack bars mounted for sliding movement on the head, means carried by said rack bars for engaging the plungers, a rack bar arranged at right angles to the first mentioned rack bars, pinions forming a connection between the single rack bar and the pair of rack bars and an adjustable stop on the single rack bar.

3. In a machine of the class described, an oscillatory head having compressed dough-receiving chambers, plungers in said chambers, a pair of rack bars arranged for movement on the oscillatory head, a rack bar arranged at right angles to the first mentioned rack bars, pinions forming connections between the single rack bar and the pair of rack bars, an adjustable stop on the single rack bar, and independently adjustable members which form stops for limiting the rearward movements of the plungers.

4. In a dough dividing machine, the combination of a hopper, a dough receiving chamber, a mold member having a compartment adapted to receive dough from the said chamber, means for regulating the capacity of said compartment, a plunger adapted to operate in the dough receiving chamber and adapted on its rearward stroke to draw dough from the hopper into said chamber and on its forward stroke to force dough from the chamber into the said compartment, means for actuating said plunger, and means for varying the stroke of said plunger to regulate the amount of dough drawn into the dough receiving chamber from the hopper.

5. In a dough dividing machine, the combination of a feed hopper, a mold member provided with a mold compartment, means for varying the capacity of said mold compartment, a plunger adapted to draw dough from the hopper on its rearward stroke and to force the dough so drawn from said hopper into the mold compartment, on its forward stroke, and means for varying the stroke of said plunger whereby to determine the amount of dough that will be drawn from said hopper so that it may correspond with the capacity of the mold compartment.

6. In a machine of the character described, a hopper, a plunger chamber communicating therewith, a reciprocable plunger located in the chamber, a lever for actuating the plunger, means for moving the lever and means for varying the throw of the plunger independently of the throw of the lever without varying the forward limit of the motion of the plunger.

7. In a machine of the character described, a hopper, a chamber communicating therewith, a reciprocable plunger located within the chamber, a reciprocable plate for controlling communication between the hopper and the chamber, simultaneously actuated means for operating the plate and the plunger, and adjustable means for varying the length of the stroke of the plunger without varying the forward limit of its motion.

8. In a machine of the character described, a hopper, a chamber communicating with the hopper, a reciprocating plunger in the chamber, means for actuating the plunger, and means for varying the length of the stroke of the plunger independently of the motion of the actuating means.

9. In a dough dividing machine the combination of a dough hopper, a measuring plunger, operating means for reciprocating the plunger, and an adjustable stop member with which said last mentioned means coöperates to actuate the plunger on its measuring stroke.

10. In a dough dividing machine the combination of a hopper, a dough measuring plunger, means for reciprocating the plunger to draw the desired measure of dough from the hopper, and a screw adjustable stop member for providing operative engagement between the plunger and last mentioned means in the measuring movement of the plunger, said screw adjustable means being adjustable to vary the extent of the measuring stroke of the plunger without varying the limit of its forward movement.

11. In a machine of the character described, a hopper, a chamber communicating therewith, a reciprocating plunger operating in the chamber, means for actuating the plunger, and a screw adjustable stop member adjustable relative to said means, to vary the length of the measuring stroke of the plunger independently of the movement of the actuating means.

12. In a machine of the class described, the combination of a hopper, a reciprocating measuring plunger coöperating therewith, a link extending rearwardly from said plunger, a lever coöperating with said link, means for operating said lever to reciprocate the plunger, and a screw adjustable stop member associated with said member and said link and adapted to determine the point of the operative engagement of the two upon the measuring stroke of the plunger.

In testimony whereof I hereunto affix my signature in the presence of two witnesses, this 12th day of December, 1911.

WILLIAM G. KIRCHHOFF.

Witnesses:
M. P. SMITH,
JESSIE CLARK.